United States Patent [19]

Heidjann et al.

[11] 4,355,647
[45] Oct. 26, 1982

[54] DEVICE FOR DISTRIBUTING SCREEN MATERIAL

[75] Inventors: Franz Heidjann; Werner Fromme, both of Harsewinkel, Fed. Rep. of Germany

[73] Assignee: Claas Ohg, Harsewinkel, Fed. Rep. of Germany

[21] Appl. No.: 241,457

[22] Filed: Mar. 3, 1981

[30] Foreign Application Priority Data

Mar. 5, 1980 [DE] Fed. Rep. of Germany ....... 3008385

[51] Int. Cl.³ ..................... A01F 12/32; A01F 12/44
[52] U.S. Cl. ................................ 130/24; 56/209; 130/27 AE
[58] Field of Search .............. 130/27.2, 24, 27 AE; 56/209, 210

[56] References Cited

U.S. PATENT DOCUMENTS

| | | | |
|---|---|---|---|
| 509,082 | 11/1893 | Heald | 130/27 AE |
| 720,699 | 2/1903 | King | 130/27.2 |
| 793,968 | 7/1905 | Vold | 130/27 AE |
| 1,064,440 | 6/1913 | Brown | 130/27 AE |
| 1,917,536 | 7/1933 | McIntire | 130/24 |
| 2,189,706 | 2/1940 | Clipston | 130/24 |
| 2,251,655 | 8/1941 | Bostic | 56/209 |
| 2,587,918 | 3/1952 | Stout | 130/27 AE |
| 2,691,444 | 10/1954 | Oliver | 130/27 AE |
| 3,109,433 | 11/1963 | Claas | 130/27.2 |
| 4,103,691 | 8/1978 | Shaver | 130/24 |

*Primary Examiner*—Paul J. Hirsch
*Attorney, Agent, or Firm*—Michael J. Striker

[57] ABSTRACT

A combined harvester has a sieve box having a receiving plate for receiving the grain threshed by the combined harvester and at least one sieve receiving the grain from the receiving plate, a drive operatively connected to the sieve box for oscillating the same in a predetermined direction, and a device operatively connected to the sieve box for changing the direction of oscillation of the latter during movement of the combined harvester over a slope inclined in a direction transverse to a longitudinal axis and concomitant lateral inclination of the receiving plate and the sieve in dependence upon the lateral inclination to thereby obtain a uniform distribution of the grain on the receiving plate and the sieve by changing the transportation direction of the grain.

8 Claims, 7 Drawing Figures

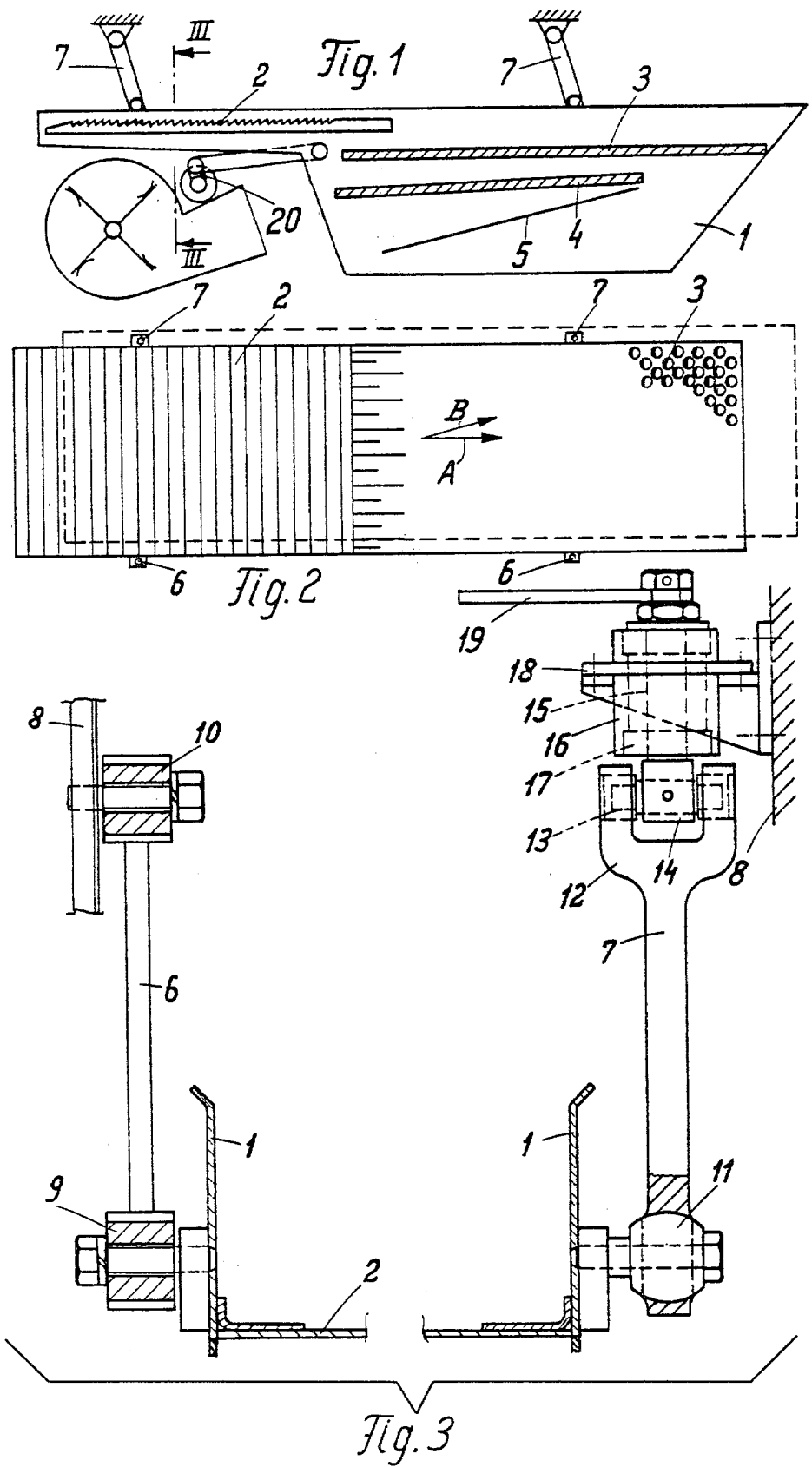

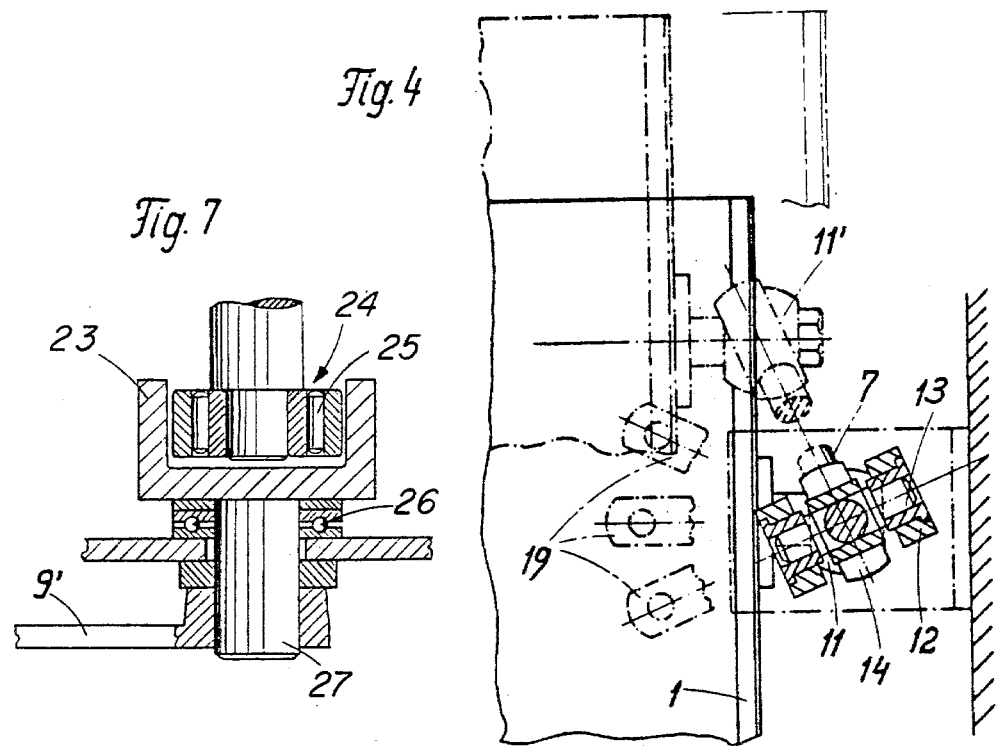
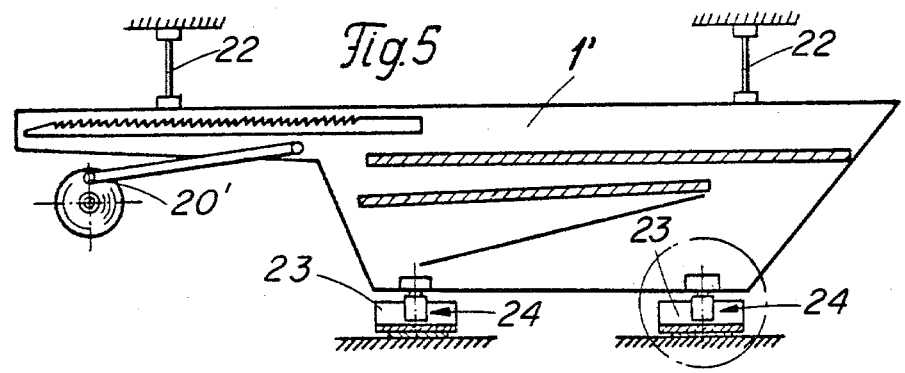
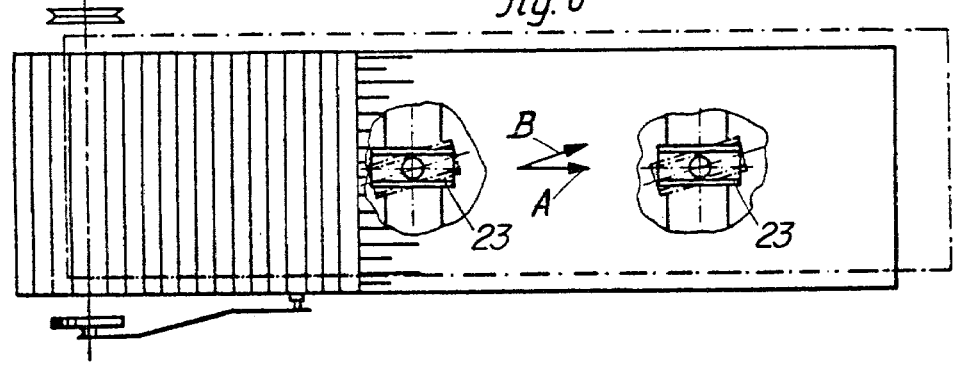

DEVICE FOR DISTRIBUTING SCREEN MATERIAL

BACKGROUND OF THE INVENTION

The invention relates to a device for even distribution of material on oscillating feeding and cleaning members of screen feeders at an angled position, preferably for even distribution of grain material in the screening box of a selfdriving harvester thresher during movement of the latter over a laterally inclined slope.

In selfdriving harvest threshers or harvester combines the problem exists that during threshing at a slope the feeding and cleaning screens are excessively loaded at one side because the material slides to one side of the feeding and cleaning screens when the machine is at a laterally inclined position. Thereby, these members are subjected to wear and tear on one side and, on the other hand, the cleaning effect is very low because the harvest material accumulates only at one side, so that the operation causes a great loss of grain. In order to eliminate this disadvantage, it is known, to provide transverse rakes on hurdle vibrators of selfdriving harvest threshers which are cyclically moved and throw the grain-straw mixture to be cleaned to the center of the hurdle vibrator. However, it had been shown, that in practical use, such rakes are plugged up with grain and then are jammed in their supports and cannot operate any longer.

SUMMARY OF THE INVENTION

It is therefore an object of the invention to provide a device of the aforementioned type which meets the requirement of the rough conditions during harvesting and which also provides a good distribution of the material on the feeding and screen members. This is obtained in accordance with the invention in that the oscillation direction and thereby the feeding direction of the material to be fed is changed dependent on the lateral inclination of the feeding and cleaning members. For this purpose, the feeders are suspended on guide rods in the housing, whereby the guide rods are rotatable on one side and the guide rods of the other side are provided with universal elastic supports in their joint points. The guide rods are rotatable and are provided with forks on their upper ends which support a joint, whereby the pins of the joint are guided rotatably in a stationary support. In a simple manner, an adjustment lever is connected with the pin. In accordance with a further embodiment of the invention this adjustment lever is coupled with a pendulum by means of an intermediary member. Advantageously, the pendulum is attenuated and represents a structural element of the machine, for example, the battery or the tank. In order to obtain a sufficient rotating of the adjustment guide rods, the rotational axis of the adjustment guide rods runs through the center of the joint. Another possibility to change the feeding direction while threshing at a slope is seen in accordance with the invention that the feeder is suspended in the machine housing by means of elastic members and is guided on guides which are provided below or laterally of the feeder. Thereby, the guides are disposed as rotatable U-profiles, wherein pins are guidingly connected with the feeder. A possibility of rotating the U-profiles is seen in that they are mounted in pins which are mounted in supports and on which an adjustable lever is mounted. In large and heavy machines it is recommended to actuate the control of the adjustment levers or the U-profiles electrically or electric-hydraulic.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 the cleaning device of a harvest thresher in a side view,

FIG. 2 the preparation bottom and the upper screen in a plan view of the cleaning device shown in FIG. 1, FIG. 3 an enlarged sectional view in accordance with line III—III of FIG. 1, FIG. 4 a part of FIG. 3 in a plan view, FIG. 5 the cleaning device of a harvest thresher in the side view in a modified embodiment FIG. 6 a plan view on the cleaning device in accordance with FIG. 5, and FIG. 7 the circled part shown in FIG. 5 in an enlarged shape and rotated by 90°.

DESCRIPTION OF PREFERRED EMBODIMENTS

FIG. 1 shows a side wall 1 of a screen box, between this wall and the opposite wall, not shown, the preparation bottom 2, the upper screen 3, the lower screen 4, as well as the grain return bottom or receiving plate 5 are provided in a known manner. The total screen box is mounted in an oscillating manner on four guide rods 6 and 7 in the harvest thresher, whereby the guide rods 7 are designed as adjustment guide rods. As is shown for clarification purposes in FIGS. 3 and 4, the guide rods 6 are mounted on the screen box side wall 1 as well as on the harvest thresher side wall 8 pivotably and rotatably by intermediary elastic supports 9 and 10. On the one hand, the adjustment guide rods 7 are connected with side wall 1 by means of a ball head 11 and the other ends of the adjustment guide rods 7 have a fork like design. These forks 12 support one each axis 13 which in its center is encompassed by one each shaped part 14. The latter, namely 14 are fixedly connected with a support pin 15 which are rotatably mounted by means of a ball bearing 17 in a stationary support 16. The stationary supports 16 are fixedly connected with a bracket 18 which is screwed on the harvest thresher side wall 8. On the upper end of a pin 15 which extends from the fixed support 16 upwardly a lever 19 is mounted which in dependency from the angled position of a harvest thresher, for example, when threshing at a slope, is adjusted by a pendulum. Thereby, the adjustment guide rod 7 is rotated, so that the screen box does not only make the movement indicated by arrow A in FIG. 2, but also receives a component in arrow direction B (which indicates an end position with dotted lines). Due to this measure, namely by rotating the guide rod 7 (or both guide rods 7) the harvested material in the screen box is thrown to one side of the screen box where the cleaning members are mounted, so that an even distribution of the material occurs on the cleaning members when threshing at a slope, because without this measure the material would follow the angled position of the harvest thresher and slide onto one side of the cleaning members. It is also obvious that the crank 20 which drives the screen box must also be connected by means of elastic supports with the screen box, so as to enable a movement of the screen box in arrow direction B, as well as the guide rods 6.

A further possibility to furnish to the screen box a movement direction composed of the two components A and B (arrows in FIG. 2 and FIG. 6) is shown in FIGS. 5 to 7. In this case, the screen box 1' is mounted in an oscillating manner by elastic members 22 in the harvest thresher and is movable in an oscillating member by means of crank 20'. The movement direction of screen box 1' is determined by two rotatable track pieces 23 which are mounted in the harvest thresher beneath the screen box 1'. In these track pieces 23 which are upwardly open U-profiles, one each pin 24 is fixedly mounted with the bottom of screen box 1' and guided by a ball bearing 25. The track pieces 23 are rotatably connected with associated pins 27 in 2 with the harvest thresher fixedly mounted supports 26. The pins 27 are extended downwardly and mounted onto the extensions of adjustment levers 9' which, for example, can be also rotated by a weight pendulum. The rotated position of track pieces 23 is shown in FIG. 6 with dotted lines. The pendulum which adjusts during the angled position of the harvest thresher during slope threshing can be designed as a part of the harvest thresher. For example, the batteries or the tank may be used as the pendulum. They may be connected with the adjustment lever 9' by a pulling member. The mounting of crank 20' naturally must also be in connection with the screen box 1' by means of elastic intermediary members.

It will be understood that each of the elements described above, or two or more together, may also find a useful application in other types of constructions differing from the types described above.

While the invention has been illustrated and described as embodied in a device for distributing screen material, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a combine harvester having a longitudinal axis, a combination comprising a sieve box having a receiving plate for receiving the grain threshed by the combine harvester and at least one sieve receiving the grain from said receiving plate; drive means operatively connected to said sieve box for oscillating the same in a predetermined direction; and further means operatively connected to the sieve box for changing the direction of oscillation of the latter during movement of the combine harvester over a slope inclined in a direction transverse to said longitudinal axis and concomitant lateral inclination of said receiving plate and said at least one sieve in dependence on said lateral inclination to thereby obtain a uniform distribution of the grain on said receiving plate and said at least one sieve by changing the transportation direction of the grain.

2. A combination as defined in claim 1, and further comprising a housing, said oscillation direction changing means including at least one first and second guide rods connecting said sieve box with said housing, said first guide rod being turnable, and said second guide rod having two ends and being connected at said ends with said sieve box and said housing, respectively, said oscillation direction changing means further having first connecting means for connecting said second guide rod with said sieve box and said housing and including a universal elastic support connecting each end of said second guide rod with said sieve box and said housing, respectively.

3. A combination as defined in claim 1; and further comprising a housing, said oscillation direction changing means including at least one first and second guide rods connecting said sieve box with said housing, said first guide rod being turnable and having a forked end connected with said housing, said oscillation direction changing means further having second connecting means for connecting said forked end of said first guide rod with said housing and including a joint supported by said forked end and having a pin, and a stationary support in which said pin is rotatably mounted.

4. A combination as defined in claim 3, wherein said oscillation direction changing means further has an adjustment lever fixedly mounted on said pin.

5. A combination as defined in claim 3, wherein said joint has a center, said first guide rod having an axis of rotation extending through said center of said joint.

6. A combination as defined in claim 1; and further comprising a housing, said oscillation direction changing means including at least one elastic member suspending said sieve box in said housing, and at least one guide provided below said sieve box and guiding the latter.

7. A combination as defined in claim 6, wherein said guide is formed as a rotatable U-profile, said oscillation direction changing means further having a pin guided in said U-profile and connected with said sieve box.

8. A combination as defined in claim 7, wherein said oscillation direction changing means further has a further pin mounting said U-profile, a support holding said further pin, and an adjustment lever arranged in said further pin.

* * * * *